United States Patent
Newman

(10) Patent No.: US 7,021,760 B2
(45) Date of Patent: Apr. 4, 2006

(54) SOFT CONTACT LENS CAPABLE OF ENGAGEMENT WITH AN EYE EITHER RIGHT WAY OUT OR INSIDE OUT

(75) Inventor: Stephen Donald Newman, Singapore (SG)

(73) Assignee: Clearlab PTE Ltd., Singapore (SG)

( * ) Notice: Subject to any disclaimer, the term of this patent is extended or adjusted under 35 U.S.C. 154(b) by 0 days.

(21) Appl. No.: 10/470,903

(22) PCT Filed: Jan. 31, 2002

(86) PCT No.: PCT/AU02/00098

§ 371 (c)(1),
(2), (4) Date: Jul. 31, 2003

(87) PCT Pub. No.: WO02/061497

PCT Pub. Date: Aug. 8, 2002

(65) Prior Publication Data

US 2004/0061828 A1 Apr. 1, 2004

(30) Foreign Application Priority Data

Jan. 31, 2001 (AU) .................................. PR2766

(51) Int. Cl.
*G02C 7/04* (2006.01)

(52) U.S. Cl. .............................. 351/160 R; 351/160 H; 351/161; 351/162

(58) Field of Classification Search ............ 351/160 H, 351/160 R, 161, 162, 177
See application file for complete search history.

(56) References Cited

U.S. PATENT DOCUMENTS

| | | | |
|---|---|---|---|
| 4,896,958 A | * | 1/1990 | Ames et al. ............ 351/160 R |
| 5,936,704 A | * | 8/1999 | Gabrielian et al. ..... 351/160 R |
| 6,199,982 B1 | | 3/2001 | Oyama et al. |
| 6,206,520 B1 | | 3/2001 | Jubin et al. |
| 6,244,709 B1 | | 6/2001 | Vayntraub et al. |
| 6,260,966 B1 | | 7/2001 | Sawano et al. |
| 6,322,215 B1 | | 11/2001 | Bristol |
| 6,357,876 B1 | | 3/2002 | Oyama et al. |
| 6,364,483 B1 | | 4/2002 | Grossinger et al. |
| 6,390,622 B1 | | 5/2002 | Muckenhirn et al. |
| 6,457,826 B1 | | 10/2002 | Lett |
| 6,467,903 B1 | | 10/2002 | Back |
| 6,474,814 B1 | | 11/2002 | Griffin |
| 6,511,178 B1 | | 1/2003 | Roffman et al. |
| 2003/0016331 A1 | | 1/2003 | Mandell |

FOREIGN PATENT DOCUMENTS

| | | |
|---|---|---|
| EP | 0 453 231 B1 | 10/1991 |
| FR | 2 248 527 | 5/1975 |

* cited by examiner

*Primary Examiner*—Ricky Mack
*Assistant Examiner*—Brandi Thomas
(74) *Attorney, Agent, or Firm*—Rader, Fishman & Grauer PLLC; Bryan G. Pratt

(57) ABSTRACT

A soft contact lens for fitting to an eye of a wearer in either a right way out orientation or in an inside out orientation; the lens including first and second generally arcuate surfaces each terminating at an edge of the lens; wherein, each said first and second surfaces are capable of forming either an anterior convex or posterior concave surface; wherein in said right way out orientation there is provided an anterior convex surface and a posterior concave surface and in said inside out orientation said right way out anterior convex surface is converted to a posterior concave surface and said right way out posterior concave surface is converted to a convex anterior surface.

44 Claims, 6 Drawing Sheets

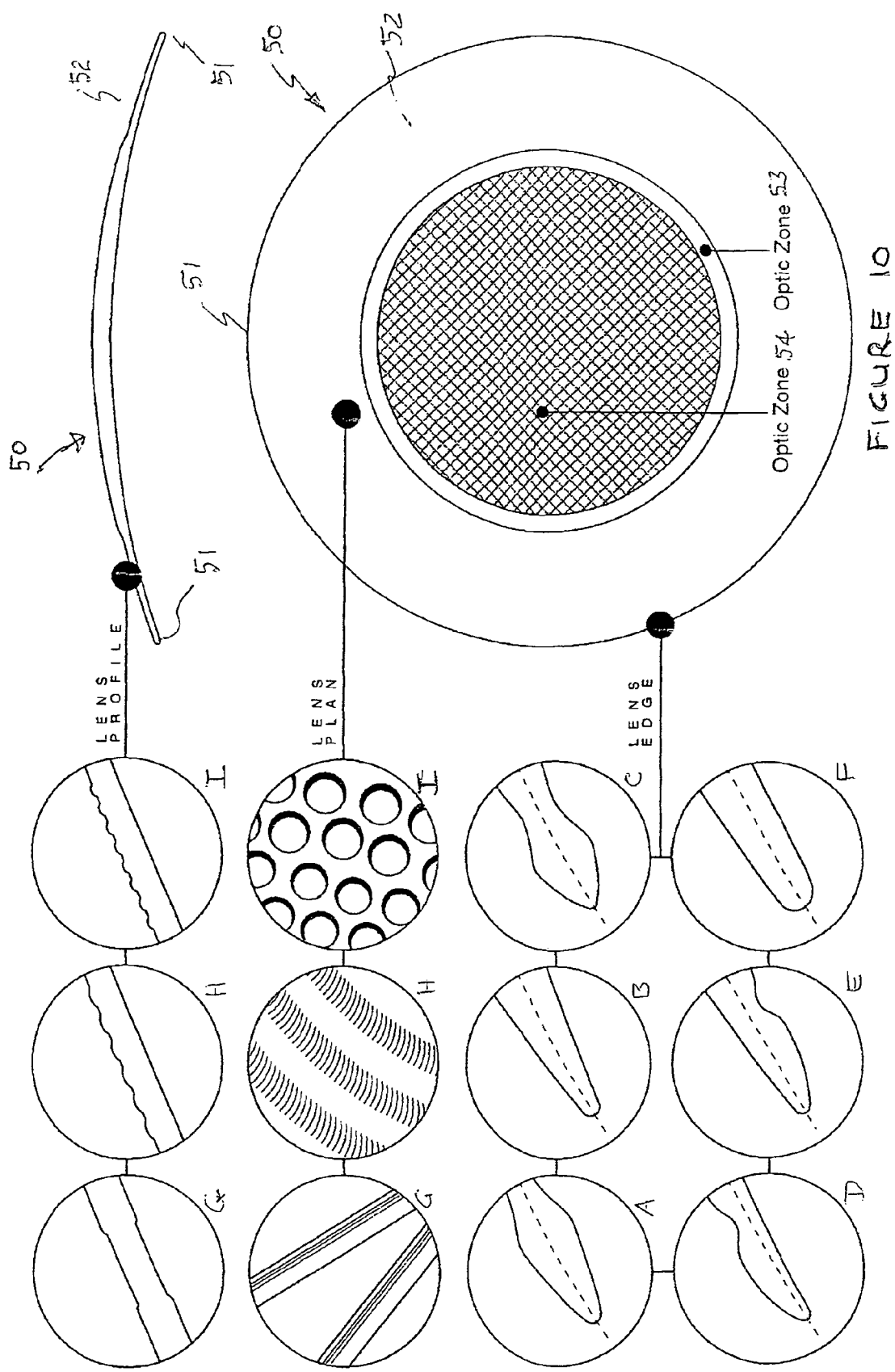

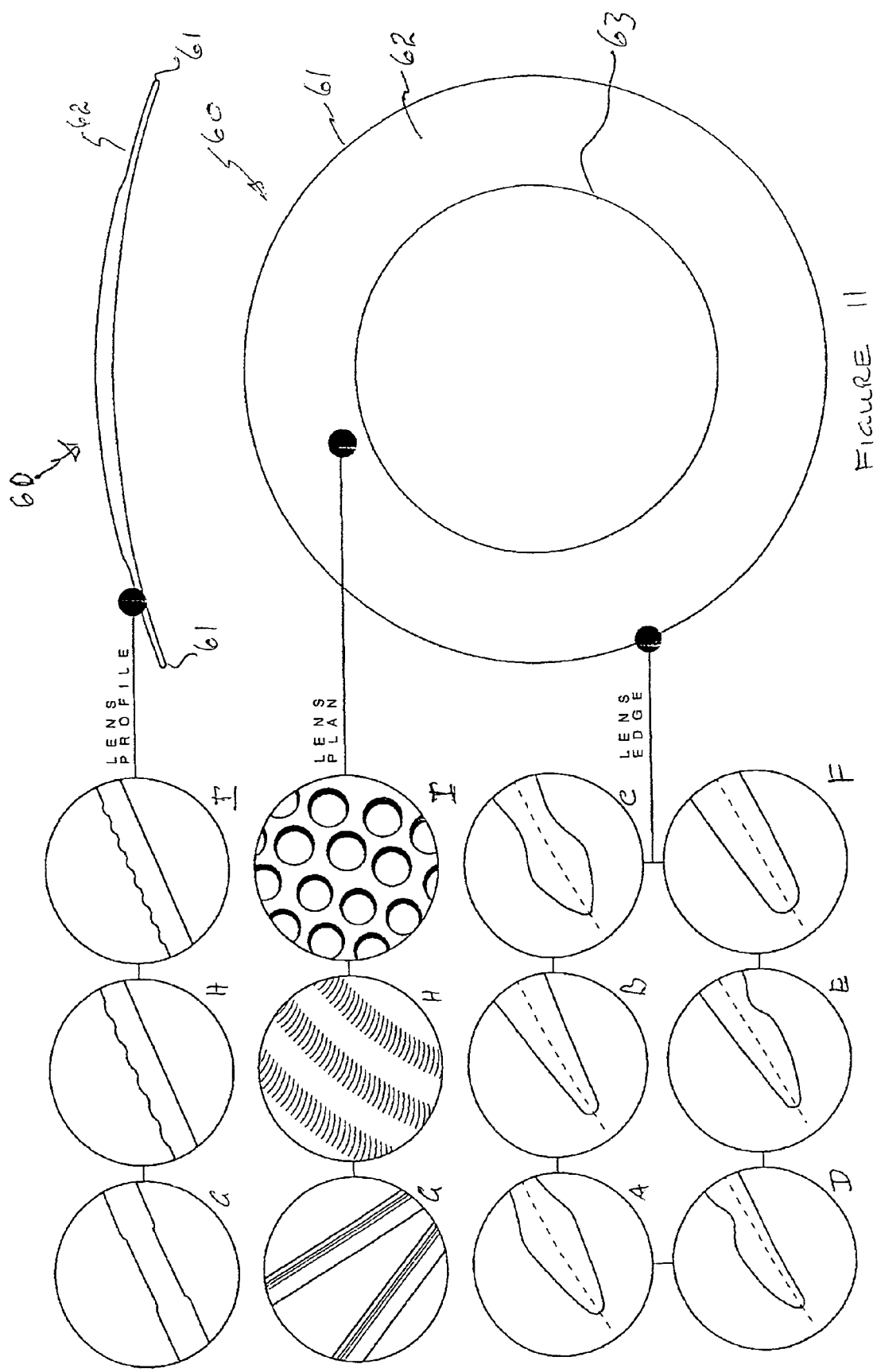

SOFT CONTACT LENS CAPABLE OF ENGAGEMENT WITH AN EYE EITHER RIGHT WAY OUT OR INSIDE OUT

BACKGROUND

The present invention relates to contact lenses and more particularly relates to an improved contact lens which can be fitted to an eye in a first orientation and also in another orientation. More particularly the invention relates to a soft contact lens which may be fitted according to conventional orientation right way out or inside out such that a front or back surface may oppose a corneal profile to effect refractive correction and to provide alternative fitting regimes for a variety of optical effects. The invention further comprises a contact lens which includes relief areas located outside optic zones on the front and back surface of the lens to enable fitting of the lens in a conventional orientation or in an inside out orientation. More particularly, the present invention relates to a soft contact lens of the spherical, toroidal or non rotationally symmetrical type, wherein the lens is capable of flexing between a right way out orientation and an inside out orientation wherein fit criteria are satisfied and optical performance is not compromised.

PRIOR ART

Traditionally soft contact lenses have been designed to fit to the eye in such a way as to provide for a close and comfortable relationship between the eye and the contact lens.

A soft lens is generally designed with a base curve (or curves) which is/are configured to fit the lens to the corneal/scleral profile of the eye, a diameter which is generally larger then the corneal diameter and an anterior curve (or curves) which provides for the refracting function of the lens. There are derivations to this simple model whereby the contact lens surfaces are designed such that portions of the base curve or the anterior curve are used to contribute specifically to the refracting effect as well as providing a fitting role. In all cases however, the lens will be provided with a base curve which is used to fit the lens to the eye and a front curve which, in combination with the base curve, provides the eye with a refractive correction.

This traditional model of soft contact lens fitting has evolved over the years to become more sophisticated but still employs the basic principles of optics and physics. Certain improvements in knowledge have not necessarily been matched as yet by improvements in design philosophy. One could argue that the contemporary still echoes the traditional.

The contemporary method of fitting a soft contact lens takes into account the following;

1. The scleral (white of the eye) curve is somewhat flatter than the corneal curve (s) and will therefore have an influence on the fitting of any soft contact lens that has a large enough diameter to encroach out from the cornea onto the sclera. Virtually all soft contact lenses today are fitted with the diameter encroaching out onto the sclera for reasons of comfort and in vivo stability.
2. A fitting allowance has to be made for this scleral flattening effect and this results in a soft contact lens being fitted to the eye with a base curve (s) which is/are flatter than the corneal curve (s). The degree of difference between the base curve (s) of the contact lens and the corneal curve (s) can vary with the design but will still result in an overall flatter curve (s) than the corneal curve (s). The base curve (s) of the soft contact lens will be generally steeper than the scleral curve (s) and this combination of fitting effects (in combination with the inherent flexibility of a soft lens) assists in keeping the contact lens in close apposition to the eye.
3. As the soft contact lens is made of a flexible polymer it will generally conform to the corneal/scleral profile and 'wrap' onto the eye.
4. The optimum fitting of a soft contact lens requires that the lens be not fitted too tightly to the eye, such that it will exhibit some free movement when physically influenced in some way (e.g. during the blinking phase of the eyelids), yet still return to a centrally placed position on the eye once that influence is removed. This important requirement is the one of the main reasons behind the fitting philosophy that provides for a soft contact lens with a flatter than corneal curve (s) base curve (s).
5. The lens must conform to the corneal/scleral profile and yet still exhibit a freedom of movement under an influence (such as the lid forces during blinking). It should not be fitted so tightly that its edges impinge on the scleral blood vessels and it should not unduly depress the bulbar conjunctiva. It should not be fitted so loosely however that it moves excessively on the eye whether under physical influence or not. A loose fitting lens will lag and descend on the eye in the primary gaze. It will generally exhibit a greater degree of discomfort than an optimally fitted lens.
6. A soft lens is designed with its overall thickness being a critical part of that design. This is due to the fact that the eye receives most of the oxygen it needs for good morphology from the atmosphere and as such suffers when there is a reduction in that uptake of oxygen. This can be caused by a medium such as a contact lens presenting as a barrier to oxygen flux. A soft contact lens can cause a condition known as oedema in the sensitive cornea by way of oxygen deprivation. The oxygen is drawn from the atmosphere through the contact lens by way of a gaseous flux and can be impeded if the material component (plastic) of the lens acts as a barrier to that gas transmission. Traditional soft lens materials are made up of polymers that do not allow the passage of oxygen via themselves but contain or bind water in various amounts and configurations and as such provide a passage for oxygen flux. In the case of traditional soft contact lens polymers therefore, it is preferable that the lens polymer content be kept to a practical minimum. It should be noted however that there might exist certain restrictions with regards to this minimum in relation to maintaining a practical level of refractive index and a practical handling modulus. Such a philosophy, amongst other design considerations, results in the lens being kept to a minimum thickness. This design concept improves the amount of oxygen available to the cornea for any given water content lens and can increase the in vivo flexibility of that lens.
7. The tear layer, which resides under the lens and in front of the cornea, is very thin and has very little influence on the overall refractive effect of the lens/eye combination. A number of factors contribute to this phenomenon, not the least of which is the fact that the refractive index of the tears is approximately 1.336 whereas the typical soft lens refractive index is approximately 1.41. As the corneal refractive index is approximately 1.375 there is little difference between the refractive index of the tear layer and that of the cornea. If the tear layer is sufficiently thin it can be considered negligible for the purposes of the overall calculation of the refraction of light. The overriding interfaces for the purposes of light refraction into the eye will be as follows . . . .
1: air/anterior surface of the contact lens,
2: posterior surface of the contact lens/the cornea.

The most influential of the two will be the air/lens interface as the refractive index of air is 1.00. This is the reason designers of thin soft contact lenses can usually ignore the refracting influence of the post lens tear layer in their overall design calculations.

8. Conventional contemporary soft contact lens fitting accepts that, as the contact lens conforms or wraps intimately to the cornea-scleral profile, it does not need to have the post lens tear layer taken into account as a refracting component and therefore generally precludes the need to do the same when designing the appropriate lens for any given eye.

9. It is also generally accepted however, that this wrapping or deforming from the lens's in vitro state can have a noticeable refractive influence on the eye as the curves of the contact lens 'change' in order to accommodate the profiles of the cornea and sclera. As the radius of curvature of the scleral profile is flatter than the generally accepted "best fit" contact lens base curve (s) and the corneal curve (s) is steeper than same, it is usually accepted that the central base section (posterior surface) of the contact lens has to steepen in curvature (s) so that it conforms to the corneal curve (s) and the posterior peripheral section has to flatten in order to conform to the scleral profile.

As a result of the posterior surface deformation there is a physical adjustment in the relationship between the anterior surface of the lens and the posterior surface. This relationship change can be described by analysing the shift in the "normals to the no-strain boundary" that exists within the contact lens. The shift that needs to be described is the shift from the in-vitro shape of the contact lens to the in-vivo shape of the same contact lens after deformation by way of wrapping to the cornea-scleral profiles.

The "normals to the no-strain boundary" can best be visualised by imagining a number of short lines that exist within the confines of the contact lens's anterior and posterior surfaces which are (and will always remain) perpendicular to a longer line that runs from one edge of the contact lens to the other in a plane of least resistance that exists somewhere between the anterior and the posterior surfaces The plane of least resistance is one that will describe the optimum path along which the contact lens can deform or bend whilst maintaining it's maximum level of equanimity. It is the path through the lens (in a profile perspective) which will be the least affected by the inevitable deformation of the lens's anterior and posterior surfaces as the posterior surface wraps to the corneal-scleral shape. The deformation of the posterior surface will cause a subsequent deformation of the anterior surface and it is the changes in the relationship between these two surfaces that are being heretofore described.

It should be noted that the geometry of the contact lens itself has a direct bearing on the location of the no-strain boundary and the relationship between the anterior and posterior surfaces will also be influenced by the design geometry of the lens.

In a traditional lens design the arcuate length of the anterior surface may differ slightly from the posterior surface. In the case of a minus lens, the anterior length (combined length of peripheral and optical sections) is usually greater in length than the posterior (combined back optical zone and peripheral zone). The arcuate lengths of either anterior or posterior surfaces can be altered with respect to each other in order to optimise their relationship when fitted in either orientation.

The edge design may also influence the shift of the no-strain boundary when the lens is inverted. The edge configuration and its relationship with the respective surfaces can influence the in vivo characteristics of the lens.

Another factor that may have an influence on the ultimate position of the no-strain boundary within the lens is the flexural modulus of the contact lens material. Two lenses of identical design geometry but made from differing materials may exhibit quite different fitting characteristics because of this factor. The consistency of that modulus across the lens itself may in turn be influenced by way of water content variations in particular areas (e.g. from the central cornea where the lens is most exposed to evaporation and tear disruption, to areas of the lens which are less exposed to environmental effects, such as those that are predominately under the eyelids). A gradient from drier to wet with an associated decrease in flexural modulus in those drier areas (due to loss of the in-monomer lubricant (water)) and an associated reduction in interstitial polymer spaces may influence the position of the no-strain boundary.

A lens of infinite flexure and infinite thinness would contain a no-strain boundary that was equidistant between the anterior and posterior surfaces for the entire diameter of the lens Therefore any deviation from that infinite ideal will result in a no-strain boundary of varying position and influence.

One optical effect that has been noted, as a result of the above influences, in a more common type of curvature change (i.e. that being where the anterior radius of the contact lens remains relatively unchanged over the central corneal area and then begins to flatten towards the peripheral area of the lens, including the periphery of the optic zone), is that the flattening of the radius from center to edge generally causes the corrective capacity of the lens to experience a negative power shift.

The effect of this minussing manifests in a minus lens becoming more minus in vivo and a positive lens becoming less positive in vivo.

10. Another contact lens related phenomenon that should be considered is an optical effect known as longitudinal spherical aberration (LSA). This is generally acknowledged as a simple form of aberration that exists within a family of optical aberrations. It is usually accepted (for simple lens design theory) as being rotationally symmetrical in nature but can occur meridionally in the case of toroidal lenses as well. Other optical aberrations that may create issues for optical designers include chromatic aberration, coma, non-rotationally symmetrical derivations of LSA and irregular surface created aberrations. Longitudinal Spherical Aberration (LSA) is just one of the more common aberrations to be considered in simple contact lens design.

It is an aberration that reduces the optical effectiveness of a lens by imposing a defocussing effect via the prevention of the incident rays of light from being able to converge to a common vertex point. It occurs because incident light, when passing through an optical surface(s) which is (are) spherical in curvature, will be subjected to a variety of differing incident angles of refraction. This is due to the variance in size of the angles of incidence that are subtended at the optical surface, ranging from the paraxial rays out to the peripheral rays, as the light arrives at the surface (s) of the lens. If both surfaces of such a lens are spherical in form, the resultant refracted rays of light will have been subjected to a varying rate of refraction from the center point of the lens out to the outermost optical chord. The LSA will be either negative or positive in nature depending on the sign of the lens.

In a minus lens (in air) for example, the peripheral light rays arrive at a range of virtual focus points that are further away from the lens than are those created by the rays of light passing through the paraxial area of the same lens. A lens with an optical influence such as described above (when measured in air), will exhibit a negative power shift from its center out towards its edge.

This phenomenon can be reduced or eliminated by altering the spherical nature of at least one of the surfaces of the lens to an aspheric or non-spherical surface form such that ultimately, the angles of refraction from the paraxial rays out to the peripheral rays, focus to a common point. This will improve the resolution of that lens and subsequently reduce the magnitude of its defocussing effect. This can also be described as reducing the size of the lens's blur circles.

In the case of a soft lens, which, once fitted, conforms closely to the corneal-scleral curvatures (the cornea being generally aspheric in form), the in vivo LSA is reduced somewhat from that measured in vitro. Nevertheless, for those lenses that are of medium or higher power (e.g. greater than −6.00 DS and greater than +4.00 DS) the optical benefits of LSA reduction can be generally realised. Variations to the above mentioned wearing and fitting influences (by way of variations in the wrapping effect of the lens on the eye) may create corresponding variations in the ultimate optical and physical wearing experience. The contemporary contact lens fitter knows and understands these influences and effects and can order his or her patient's contact lenses accordingly. Most contact lens manufacturers today offer various lens designs and materials in an attempt to address some or all of the above. All of the above information is based upon the contemporary application of what can be considered basic and traditional optical and physiological phenomena.

Whether contemporary or traditional, today's lens fitting concepts and practices and the lens designs that are created to accommodate them are all based upon the premise that the lens must have a base curve (s) (posterior side) and a front curve (s) (anterior side).

This notion confirms that the correct fitting of the contact lens is achieved when the base curve is in close apposition to the eye and the anterior surface is the surface exposed outwards toward the air. Current nomenclature in texts and books, fitting guides, patient information leaflets, labels and general educational or guidance materials conform to this premise. In fact the qualification of contact lenses via Government regulatory bodies is based upon internationally agreed terminology that supports the above.

Contact lenses that are available today and the nomenclature associated with their manufacturing, verification and fitting conform to this notion.

Lens orientation is expressed in terms such as "inside out" (inverted) or the "right way out". This terminology or those which are similar are used to express whether or not the contact lens in question is being presented to the eye in the proper (right way out) fitting orientation.

Patients are taught, at the time of dispensing, to recognize when their lenses are inside out and are shown how to place them on their eyes in the correct configuration. This is generally achieved by demonstrating to the patient that the lens will appear to have a slightly different shape when turned inside out. They are shown how to reconfigure the lens prior to insertion to ensure a "correct" fit. Some companies even mark their lenses with "anti-inversion" marks by engraving or laser etching means in an effort to provide the patient with an easy way to determine the correct lens orientation.

The reasoning behind this philosophy is simple. Traditional lenses were designed to fit the corneal/scleral profile from a curve-matching platform. Hard lenses were the first contact lenses to be used by practitioners and had to be curve matched to the cornea in order to maintain a sufficiently strong enough relationship such that the hard lens would remain on the eye. This is particularly evident during the blinking phase when the lens is dislodged from its primary (an equilibrated state of fitting where the post lens tear forces are at their lowest) position and is forced downwards with the action of the upper lid. The lens is generally fitted with a mild disparity between the corneal curve (s) and the base curve of the lens. This disparity in curvature will ensure that the lens can move with the lid action (a desirable action that serves to allow fresh tears to wash across and refresh the now vacated area of the corneal epithelium). This disparity is also the primary reason the lens can return to its equilibrated position on the cornea after the blinking phase is completed. As the lens is decentered away from equilibrium, a negative force builds up under the lens as the base curve to corneal/scleral disparity increases. Once the overriding influence of the upper lid is removed (by its retraction) the lens will able to resettle back where the post lens tear forces are at their lowest.

Soft lenses too work along similar principles but do not move much on the eye during the blinking phase. This is due to the larger size of the soft lens and because of its flexibility. This means the lens will wrap to the corneal/scleral profile and will resist the upper lids decentering forces more effectively. It will still move however and will still seek out an equilibrated position on the eye in the post blink phase. In this case however it is the deformation of the lens as a whole that creates a negative force when it is decentered. It is the relationship of the base curve to the corneal/scleral curves that will control this phenomenon.

If for example, the base curve of the soft lens is too tight for the eye, the lens will not move at all. If it is decentered by external means such as digital manipulation it will not return to a point of equilibrium. In this instance the disparity between the base curve and the corneal/scleral curve is too great in one direction and satisfactory equilibrium cannot be achieved.

If the base curve of the lens is too flat however the opposite will occur and the lens will not fit in a state of satisfactory equilibrium but will simply lag on the eye. It will be unstable and may even fall out of the eye under the decentering forces created by the lids during the blinking phase.

Designers therefore created lenses with base curves and secondary or tertiary curves called edge lifts in an attempt to optimize these forces so that the lens could be fitted to the eye comfortably and yet would strike a good balance between in vivo movement and fitting centration.

This created a lens design philosophy that ensured the base curve side of the lens remained just that. If a lens were to be inserted in the "inside out" position it would generally prove to be uncomfortable and may not fit to the eye in the most optimum fashion. It could also cause visual discrepancies as the optical performance could change as the wrapping of the lens varied from one position to the other. The lens was simply not designed to cater for these problems. As mentioned earlier some manufacturing companies have even applied special anti-inversion marks that allow the patient to more easily determine whether the lens is inside out or not.

The practice of anti-inversion marking of soft contact lenses could be extremely useful if adopted on a lens designed and manufactured according to the invention to be described below.

INVENTION

The present invention provides an alternative to the known soft contact lens wherein a lens is, according to the invention, capable of use on an eye in more than one orientation (right way out or inside out) such that anterior or posterior surface lens may be presented to the corneal profile such that a back surface may act as an anterior surface and an anterior surface may act as a back surface by reorientation of the lens. The invention described herein seeks to redirect the focus of contact lens fitting philosophy away from the conventional methodology but embracing traditional fitting criteria.

According to the invention there is provided a soft contact lens capable of fitting to an eye in either a "right way out" or "inside out" orientation while satisfying the traditional fitting criteria and without affecting the comfort, centration or optical performance of the lens. Certain embodiments or derivations of the lens can create specific and different or the same or similar optical corrections depending on which way out the lens is worn. This is very useful in optimising or tuning a bifocal or multifocal lens fitting modality or tuning a mono-vision fitting without having to replace a lens.

In one broad form the present invention comprises:
a soft contact lens for fitting to any eye of a wearer, wherein, the lens is capable of providing adequate fit and stability for the wearer irrespective of whether the lens is presented to a corneal profile of an eye in a right way out or inside out orientation wherein the selection of right way out or inside out orientation may be made by flexing the lens. According to one embodiment, the lens is capable of a variety of refractive corrections irrespective of the orientation of the lens.

In another broad form the present invention comprises;
a soft contact lens for refractive correction of an eye of a wearer, wherein the lens is capable of providing refractive correction, adequate fit and stability for a wearer irrespective of whether the lens is presented to a corneal profile of an eye right way out or inside out; wherein the lens is capable of providing a wearer with bifocal or multifocal correction by removing the lens and reinserting the lens in an opposing orientation.

In another broad form the present invention comprises;
a soft contact lens for fitting to an eye of a wearer, wherein the lens may be presented to a corneal profile of an eye right way out or inside out; wherein the lens has first and second opposing surfaces wherein one or both said surfaces includes at least one colour. According to one embodiment, the lens is capable of a variety of refractive corrections of an eye in both orientations.

In another broad form the present invention comprises:
a soft contact lens for refractive correction of an eye of a wearer, wherein the lens provides refractive correction, adequate fit and stability for a wearer irrespective of whether the lens is presented to a corneal profile of an eye right way out or inside out; the lens further comprising relief areas inside and/or outside an optic zone, on an anterior and/or posterior surface; the lens also satisfying fit criteria irrespective of use in the right way out or inside out orientation of the lens.

In another broad form according to the apparatus aspect, the present invention comprises:
a soft contact lens capable of assuming a generally convex shape when placed on an eye of a wearer, the lens including a first surface which may form an anterior surface or posterior surface and a second surface on an opposite side of the lens to the first surface and capable of forming a posterior surface or anterior surface; wherein, the first and second surfaces form either said anterior or posterior surfaces according to the orientation of the lens selected for placement on the eye of a wearer.

In another broad form according to the apparatus aspect, the present invention comprises:
a soft contact lens capable of assuming a generally convex shape when placed on an eye of a wearer, the lens including a first surface which may form an anterior surface or posterior surface and a second surface capable of forming a posterior surface or anterior surface wherein the first and second surfaces form either said anterior or posterior surfaces according to whether the lens is oriented right way out or inside out on an eye of the wearer; the lens further comprising formations inside and/or outside an optic zone on the anterior and/or posterior surfaces which enable the lens to satisfy fit criteria for the wearer when said lens flexes between said right way out and inside out and inside out and right way out orientation.

In another broad form the present invention comprises:
a soft contact lens for refractive correction of an eye of a wearer, the lens capable of forming a first convex orientation in which the lens has a convex anterior surface and a concave posterior surface and a second convex orientation formed by displacement of the lens by inversion along an axis normal to said anterior and posterior surfaces of said first convex orientation when the lens is viewed in profile, wherein in said second convex orientation of said lens, the anterior surface of said first convex orientation forms a posterior surface of said second convex orientation and the posterior surface of said first convex orientation forms an anterior surface of said second convex orientation. Preferably the lens includes formations which provide relief areas inside and/or outside an optic zone on the anterior and posterior surfaces which enable the lens to satisfy fit criteria for the wearer irrespective of whether the lens is in the right way out or inside out orientation.

Alternatively, the formations may be located in a regions outside an optic zone of the lens and on either side of the lens.

Preferably, said first and second convex orientations of said lens provide a predetermined refractive correction of the eye of a wearer.

According to a preferred embodiment, the anterior and posterior surfaces include an optic zone and a fitting zone including formations providing relief areas, wherein the optic zone of each said first and second surfaces is capable of providing refractive correction options for a wearer and said relief areas allow satisfaction of fit criteria for each refractive option chosen and irrespective of whether the lens is in an inside out or right side out orientation. Preferably, refractive correction by the lens is shared between the anterior and posterior surfaces.

In one broad form according to a method aspect, the present invention comprises:

a method for fitting a contact lens to an eye of a wearer for refractive correction; wherein the contact lens is capable of forming a first convex orientation in which the lens has a convex anterior surface and a concave posterior surface and a second convex orientation formed by displacement of the lens by inversion along an axis normal to said anterior and posterior surfaces of said first convex orientation when the lens is viewed in profile, wherein in said second convex orientation of said lens, the anterior surface of said first convex orientation forms a posterior surface of said second convex orientation and the posterior surface of said first convex orientation forms an anterior surface of said second convex orientation; and wherein the lens includes relief areas outside or at the outer extremities of an optic zone on the anterior and posterior surface which enable the lens to satisfy fit criteria for the wearer irrespective of whether the lens is in the right way out or inside out orientation;

the method comprising the steps of;
 a) prior to fitting the lens, reduction, removal or reshaping of normally occurring areas of resistance to said lens;
 b) designing an optical effect in the lens according to requirements of a wearer;
 c) taking the soft contact lens and electing to fit said lens in either said inside out or right way out orientation.

It is broadest form the present invention comprises:
a soft contact lens for fitting to an eye of a wearer in either a right way out orientation or in an inside out orientation; the lens including first and second generally arcuate surfaces each terminating at an edge of the lens; wherein, each said first and second surfaces are capable of forming either an anterior convex or posterior concave surface; wherein in said right way out orientation there is provided an anterior convex surface and a posterior concave surface and in said inside out orientation said right way out anterior convex surface is converted to a posterior concave surface and said right way out posterior concave surface is converted to a convex anterior surface.

Preferably the lens is spherical, toriodal or non rotationally symmetrical and the conversion from right way out to inside out is effected by flexing the lens. Lens flexure is accommodated by at least one formation/s in or on either said first and second surfaces, wherein each of the formation/s provide means to assist flexure when the lens flexes between the right way out and inside out orientations.

The formation/s is/are disposed anywhere on the first and/or second surfaces of the lens and wherein the formation/s allow/s the lens to satisfy fit criteria when the lens is in either the right way out or inside out orientation and irrespective of whether a lens base curve is oriented towards a cornea or faces away from the cornea.

The formation/s result in an adjustment to a surface contour of said first and/or second surfaces. The surface adjustment can take a number of alternative forms. In one example a lens may have a formation which originates at a lens center and propagates radially in any meridian towards the lens edge. The formation/s may comprise at least one circumferentially disposed band/s defied by a thinning or thickening in the lens at the regions of said bands or it may comprise at least one spiral region on one or both surfaces of said first and/or second surfaces of said lens. In another example, the lens includes a formation/s comprising at least one oblique region/s on one or both surfaces of said first and/or second surfaces of said lens; wherein said oblique regions lie at an angle to any meridian of said lens.

The lens according to the invention may further include formations in or on one or both said first and second surfaces of said lens comprising any one or any combination of, recesses, surface dimples, grooves, indents, circumferential bands, lines, fenestrations, dots, waveforms, reliefs, troughs, regions of thinning or thickening, spirals and oblique lines. The formations will be chosen for a particular lens according to the required resistance to flexure or strain relief required to satisfy fit criteria and refractive requirements when the lens is flexed from the right way out orientation to the inside out orientation.

The formation/s is/may be positioned in a peripheral area of the lens in a site which optimizes a resistance relieving role performed by the formation/s when the lens undergoes flexure. Lens wrapping forces may be adjusted to counter a natural tendency of a lens capable of use right way out or inside out to curl (evert) off an eye. Non curved surfaces are used to eliminate said eversion tendency. Subtle differences in fitting characteristics of the lens may be made by adjusting flexure resistance values of anterior or posterior surfaces of the lens. The formation/s are disposed in either an optic zone or fit zone or both. Optic and fit zones and optical performance, centration and fit of the lens are not affected by the formations.

Non curved surfaces are used to eliminate said eversion tendency. Subtle differences in fitting characteristics of the lens may be made by adjusting flexure resistance values of anterior or posterior surfaces of the lens. The formation/s are disposed in either an optic zone or fit zone or both optic and fit zones and optical performance, centration and fit of the lens are not affected by the formations.

A wide variety of refractive corrections may be effected by the anterior and/or posterior surfaces in the right way out configuration and by an anterior and/or posterior surfaces formed in the inside out orientation and refractive corrections by the lens may be shared or distributed across the anterior and posterior surfaces irrespective of whether the lens is in the right way out orientation or inside out orientation. Preferably, different optical corrections for an individual wearer can be made depending on selection of right way out or inside out orientation.

The lens may include by way of example, a predetermined optical correction on one of the first and second surfaces and the same or a similar optical correction on an opposite surface. It may in an alternative include bifocal corrections on one side and one optical correction an another side, similar or the same bifocal corrections on both surfaces of said lens, one optical correction on one surface and a different single optical correction on an opposite surface, the same or different multi focal corrections on both the first and second surfaces of said lens. The lens may include a single correction on one of the first and second surfaces and a multi focal correction on the other of the first and second surfaces.

According to a further embodiment the lens includes at least one colour on one side of the lens and at least one colour on an opposite side of the lens.

In another broad form of the method aspect, the present invention comprises:
a method of fitting a contact lens to an eye of a wearer; the lens including first and second generally arcuate surfaces terminating in a lens edge; wherein each said first and second surfaces are capable of forming either an anterior convex or posterior concave surface; wherein in said right way out orientation there is provided an anterior convex surface and a posterior concave surface and in said inside out orientation said right way out anterior convex surface is converted to a posterior concave surface and said right way out posterior concave surface is converted to a convex anterior surface; the method comprising the step of;
a) fitting said lens to said eye in said right way out orientation;
b) removing said lens and electing to refit the lens in the inside out orientation.

In another broad for of the method aspect the present invention comprises:

a method of fitting a contact lens to an eye of a wearer; the lens including first and second generally arcuate surfaces terminating in a lens edge; wherein each said first and second surfaces are capable of forming either an anterior convex or posterior concave surface; wherein in said right way out orientation there is provided an anterior convex surface and a posterior concave surface and in said inside out orientation said right way out anterior convex surface is converted to a posterior concave surface and said right way out posterior concave surface is converted to a convex anterior surface; the method comprising the step of;
a) fitting said lens to said eye in said inside out orientation;
b) removing said lens and refitting said lens in said right way out orientation.

Preferably, the designer may create varying optical effects as mentioned above. Or the designer can create subtle differences in the fitting characteristics of the lens by adjusting the resistance values of anterior versus posterior surfaces.

DETAILED DESCRIPTION

The present invention will now be described in more detail according to preferred but non limiting embodiments and with reference to the accompanying illustrations wherein.

Figure 1:
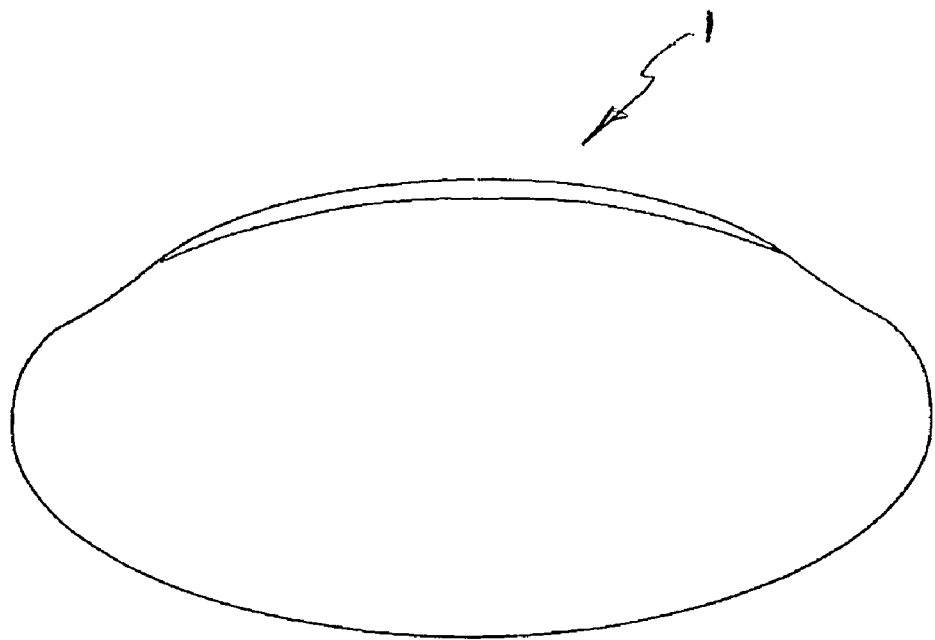
FIG. 1 shows a perspective view of a lens according to one embodiment of the invention.

FIGS. 8a-d show a variety of formations in or on a peripheral area of a lens according to embodiments of the invention.

FIGS. 9a–d show profiles views of lenses according to alternative embodiments.

FIG. 10 shows a plan view and side elevation of a lens with non limiting examples of enlarged edge formations A–F and surface formations G–I. with posterior and anterior optic zones.

FIG. 11 shows a plan view and side elevation of a lens with non limiting examples of enlarged edge formations A–F and surface formations G–I with an anterior Throughout the specification, the term right way out will be taken to refer to a lens fitted in a conventional orientation in which there is an anterior convex surface and a posterior convex surface opposing an eye and the term inside out will be taken to refer to that lens flexed inside out to cause the anterior surface in the right way out orientation to form a posterior convex surface and the posterior surface in the right way out orientation to form an anterior surface.

The lens to be described below according to various embodiments may be referred to as a 'flipper' or flexing lens due to its ability to be re oriented (flex) for reorientation on an eye. The flexing may be along an axis normal to the lens when viewed in profile by flipping of the lens thereby allowing the lens due to formations introduced into the lens forming relief areas to present to an eye in an inside out or right way out orientation. The lens according to the invention satisfies traditional fit and comfort criteria and fits optimally to the eye in either orientation by virtue of flexing of relief areas located in the optical and/or non-optical areas of the contact lens. These formations which provide strain relief areas which enable the lens to flex for reorientation can assume many configurations (examples of which are described herein and shown in the attached drawings) but share a common feature, which is described below. The lens according to one embodiment, allows for flipping (flexing) or reorientation of the lens but with clinically acceptable fitting characteristics by way of formations such as bands that are located in the optical or non optical (peripheral area) of the lens. These formations which provide areas of relief are generally thinner in profile than the surrounding areas and are shaped such that they allow the wrapping forces of the lens to be reoriented sympathetically with the general reorientation of the lens. They do this by adjusting and repositioning the normals to the no strain boundary as the lens is reoriented for fitting to the eye. This allows the lens to wrap naturally in either orientation as the profile of the lens, when fitted to the eye, will be formed such that no eversion or lifting of the lens edges will occur. The lens will also be able to retain its centering properties and can still exhibit normal levels of in eye movement.

According to one embodiment, formations in the regions of flexure in the peripheral area of the lens may contain at least one circumferential band (or bands) or area (s) that is/are thinner than the immediately surrounding areas of the lens when viewed in cross section. In a preferred embodiment, the formations providing the relief area(s) is/are positioned in the peripheral area of the lens nearer the lens edge in a selected site that optimizes a resistance relieving role the formations and thus relief areas provide. It (they) can also be placed in the outer areas of the optical zone in such a manner that it (or they) does/do not interfere with the optical performance of the lens. The formations in the lens accommodate the flexure by reducing resistance to flexure. In some cases this may be achieved by thinning and in other cases by thickening at the formation. These thinner or thicker area(s) can be designed controlled accurately by conventional means well known and understood in the art (especially with injection cast moulding means) and can be shaped or graduated in such a way as the designer sees fit in order to provide the wearer with suitable levels of in vivo comfort. As the lens profile according to one embodiment is specifically thinner in that (or those) area (s) the lens will exhibit less resistance to any non-conformance of wrapping to the lens/scleral profile when presented to same. It will possess discreet and intentional areas of least resistance that will allow the lens to bend or wrap more easily in those areas than others. By the judicious and intentional use of a formation or formations such as but not limited to circumferential bands in a selected area of one or more of the lens surfaces, the designer is able to provide the lens with sections of least resistance that coincide with the most appropriate area within the lens that will allow it to conform to the lens scleral profile. Thus, the designer can create a lens that will conform to the corneal/scleral profile in a compliant and clinically acceptable manner in either orientation. The natural resistance to being "inside out" and the abstract and uncontrolled curvature changes that occur as a result will be reduced or eliminated by the relieving areas placed within the lens. The natural tendency for an "inside out" lens to curl off the eye when inserted will be eliminated by the reorientation of the wrapping forces.

In one embodiment the lens may include the use of non-curved surfaces that can be shaped in such a way as to reduce inversion or flexure resistance as much as possible. By the use of non-curved surfaces or a combination of non-curved and curved surfaces the lens shape can be made to 'flex' inside out very easily. The flat sections can be used in conjunction with curved surfaces made from spherical sections.

According to an alternative embodiment, the formations introduced into the lens are thicker than adjacent to more conventionally designed areas of the lens. This may be required to create a stronger flexing or reorientation force.

An alternative embodiment of the lens may employ an edge profile of the lens, immediately adjacent to a formation comprising a thinner area of least resistance. When viewed in cross section, the lens would exhibit a bi-convex profile which is uniform and identical in profile on both surfaces. This peripheral rim would provide a controlling force on the edge of the lens that would prevent eversion (lifting) and would ensure that the edge demonstrated similar wrapping characteristics in either orientation. The uniform design could reflect the posterior and anterior edge shape as a mirror image of each other and thus provide for similar lid interaction profiles no matter which fitting orientation is chosen. The edge shapes may also be made from non-curved forms that may be of a flat or straight edged nature. One advantage of this approach is that the lens edge will simply conform to that area of the sclera it rests upon without adding any of its own bias from a pre shaped curvature.

According to another embodiment a peripheral rim or edge of the lens is shaped with a slightly differing profile on one face from an opposite face. This could be used, either in conjunction with other design embodiments, or on its own to obtain varying fitting characteristics when fitted in opposing orientation whilst still wrapping appropriately to the sclera.

Lens fit in either the right way out or inside out orientation, will be aided by controlling of the optic zone dimensions and the sharing of the duties of the optic zone between the anterior and posterior surfaces of the lens. Traditional soft spherical lenses and some soft toric lenses simply use the posterior surface of the lens for fitting to the eye of the wearer. The radius is selected from a fitting standpoint versus a refractive platform and thus becomes a baseline for the final choice of refractive curve on the anterior surface when the final refractive solution is considered. The power that is required to satisfy the wearer's prescription is then derived from the anterior surface curvature alone. The disparity between the posterior (base curve) radius and the anterior optic radius creates the refractive quantum. The aforementioned outline describes a typical soft contact lens in today's market.

Some known lenses in the market use a specifically designed discreet refracting segment located in the posterior surface of the lens. It is generally located in the center of the base radius and can be steeper or flatter in radius to the main base curve radius. If it is steeper in radius it will create a more minus effect to the overall refractive power of the lens and if it is flatter it will create a more plus effect to the overall refractive power of the lens. This type of refracting segment has proved to be a successful design feature in soft toric lenses and high minus lenses as described in Australian patent no 620083, U.S. Pat. No. 5,125,728 and European patent 0398984. The primary advantage of such a design feature, is in the provision of a means to arbitrarily control and influence the thickness profile and refracting curves of the lens, independent of the curvatures of the eye. In the case of the use of such a segment in a toric lens design, the fitting and refracting advantages are obvious. The designer can create the optimum set of curves to refract the eye with any given lens without being overly restricted by fitting and corneal alignment concerns. According to the invention proposed herein however, the use of a selectively designed posterior optical segment is useful as it can enhance or assist the wrapping effect of the lens, when it is placed on the eye in its "inside out" orientation, by virtue of reducing the natural resistance to flexing of the optic junction of the lens.

If a lens has a thicker junction thickness, it will resist reorientation more so than a lens with a thinner junction thickness, as the natural difference between the anterior and posterior curves will be lessened. In a minus lens for example, this is particularly relevant as the posterior curve is generally steeper in radius than the anterior curve and will prove more difficult to re-orient away from its natural shape as it increases in thickness. This thickness increase occurs from the center of the lens out to the edge of the optic junction, whereupon it can generally be reduced by the judicious use of closely approximated peripheral curves. When a minus lens is designed in a conventional manner it will encounter a natural resistance to wrapping or curving in its opposite (or unnatural) orientation as the optic junction will present the lens with an area of resistance. The reduction in junction thickness by the use of reduced optic zones can be further enhanced by the use of non-spherical curvatures and shapes that promote a smooth and seamless transition between itself and the surrounding area of the lens. This will improve the wrapping response of the lens when re-orientated even further. Such an optical design can also be used in conjunction with a surrounding relieving area (s) similar to the peripheral relieving band (s) so that the lens will wrap even more easily when re-orientated on the eye. In one instance the relieving area (s) can be positioned in close proximity to the optic junction or in close proximity to the blend (s) that make up the transition from segment to surrounding surface. It will be appreciated by persons skilled in the art of lens design, that many combinations and derivations of the above mentioned design principle are possible.

According to a further embodiment, the lens includes at least one formation providing a strain relief area within an optical area such that the relief area assists in the reorientation flexing of the lens by reducing natural resistance to flexing when it is positioned on the eye in either the right way out conventional orientation or inverted (flexed) inside out orientation but without compromise to optical effectivity.

In the case of a positive powered contact lens, the optic junction is generally constant and can be designed so that it is quite thin. The optic thickness however will increase with the strengthening of the lens power and may create a natural resistance to optimal wrapping when re-orientated on the eye A design feature of the lens proposed herein is the reduction in center thickness of the positive powered lens by the use of a posterior optical segment which is less steep in radius than the surrounding curvature (s). This approach will allow the designer to reduce the optical center thickness from that of a conventional designed lens and thus overcome its natural resistance to being "inside out". This too can be enhanced by the use of an adjacent or nearby formations providing relieving area (s).

The key to the lens achieving fitting success in either orientation is the reduction, removal or reshaping of those naturally occurring areas of resistance that are created by conventional designs. Once this is achieved and the lens can be fitted either "inside out" or the "right way out", the designer is free to create varying optical effects as mentioned above. Or the designer can create subtle differences in the fitting characteristics of the lens by adjusting the resistance values of anterior versus posterior surfaces.

It should now be appreciated that a contact lens created using the aforementioned design principles, could provide the lens designer, the lens manufacturer, the Practitioner and the wearer with many potential advantages, both from a fitting and wearing point of view and from an optical flexibility point of view.

In its most simple derivation, a design such as this allows the patient to handle the lens far more easily, not worry about correct orientation prior to insertion and generally just concentrate on enjoying wearing a comfortable lens. A lens manufactured in accordance with the invention allows the wearer to select the optimum correction for his or her optical needs at any time by lens fitting orientation. In one of its more complicated embodiments, a lens such as described before, could offer the Practitioner a genuine advantage in prescribing flexibility from both a fitting and optical perspective.

Figure 2:
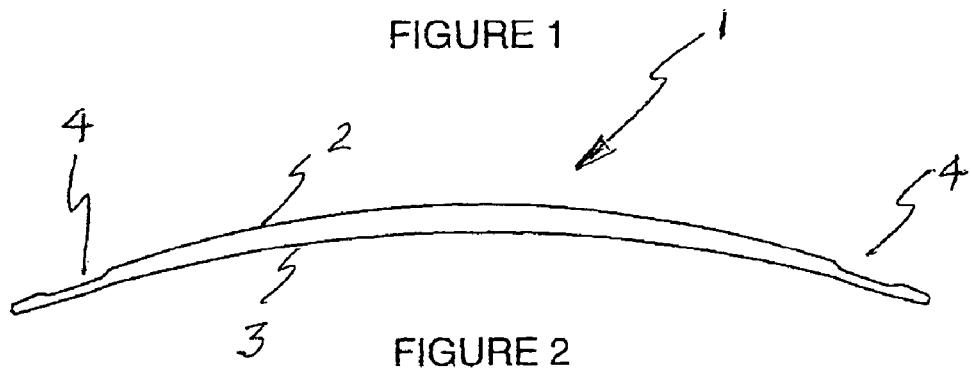
FIG. 2 shows a profile view of the lens of FIG. 1.

FIG. 1 shows a perspective view of a lens 1 according to one embodiment of the invention;

FIG. 2 shows a profile view of the lens of FIG. 1. Lens 1 comprises first and second opposed surfaces 2 and 3 which are each capable of forming anterior or posterior surfaces depending upon the orientation to the eye. As shown in FIG. 2 surface 2 forms a convex anterior outer surface and surface 3 forms a convex posterior surface. Upon flexing of lens 1 surface 2 may assume a posterior surface and surface 3 may assume an anterior surface role. Lens 1 further comprises outer zone profiles or formations 4 which provide relief areas when the lens flexes between a right way out and inside out orientation.

Figure 3:
FIG. 3 shows an alternative profile view of a lens of according to the invention.

FIG. 3 shows an alternative profile view of a lens 5 with formations 6 in a peripheral region of the lens.

Figure 4:
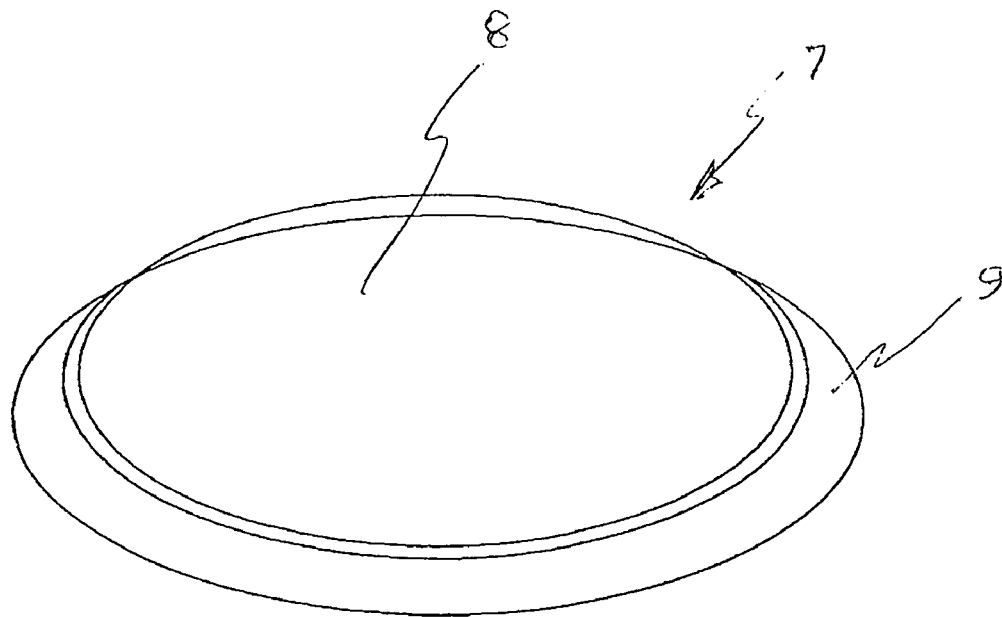
FIG. 4 shows a perspective view of an alternative lens according to an embodiment of the invention.

FIG. 4 shows a perspective view of an alternative lens 7 including an optic zone 8 and peripheral or outer fitting zone 9. These characteristics are known in soft contact lenses. A typical known lens may have an optic zone on either an anterior surface or posterior surface or both.

Figure 5:
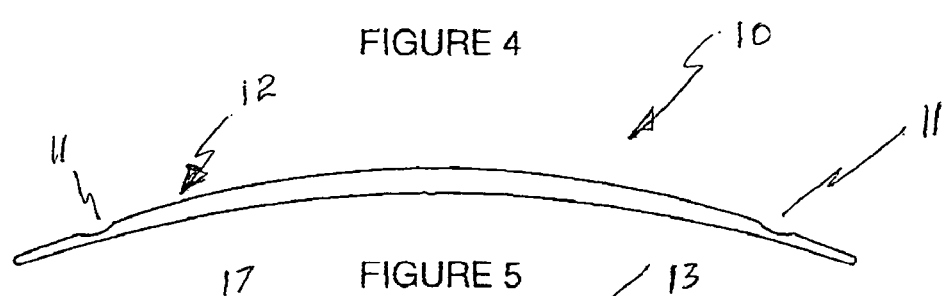
FIG. 5 shows a profile view of a lens showing relief areas according to one embodiment of the invention.

FIG. 5 shows a profile view of a lens 10 showing relief areas according to one embodiment of the invention. Lens 10 comprises circumferential formations II providing a relief areas in an outer peripheral zone on an anterior surface 12 according to another embodiment of the invention.

Figure 6:
FIG. 6 shows an alternative profile view of a lens showing formations/relief areas on one surface according to another embodiment of the invention.

FIG. 6 shows a profile view of a lens 13 showing relief areas according to another embodiment of the invention. Lens 13 comprises circumferential formations 14, 15 and 16 providing strain relief areas in an outer peripheral zone on an anterior surface 17 according to another embodiment of the invention.

Figure 7:
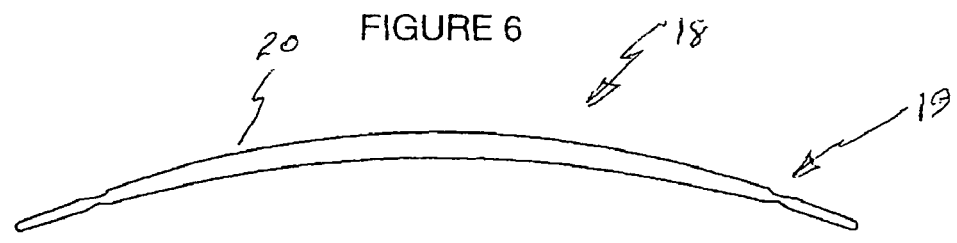
FIG. 7 shows a profile view of a lens showing formations/relief areas on opposite surfaces according to an alternative embodiment of the invention.

FIG. 7 shows a profile view of a lens 18 showing circumferential formation 19 forming relief areas according to another embodiment of the invention. Circumferential formation 19 provides a strain relief areas in an outer peripheral zone on an anterior surface 20. Formation 19 is thinner than its surrounding region and accommodates flexure of the lens when flexing between a right way out orientation and an inside out orientation.

The formations shown in FIGS. 2, 3, 5, 6 and 7 may be continuously intermittently circumferential.

FIG. 8A-D each show an alternative formations providing relief areas in a peripheral area of a lens.

Figure 8A:
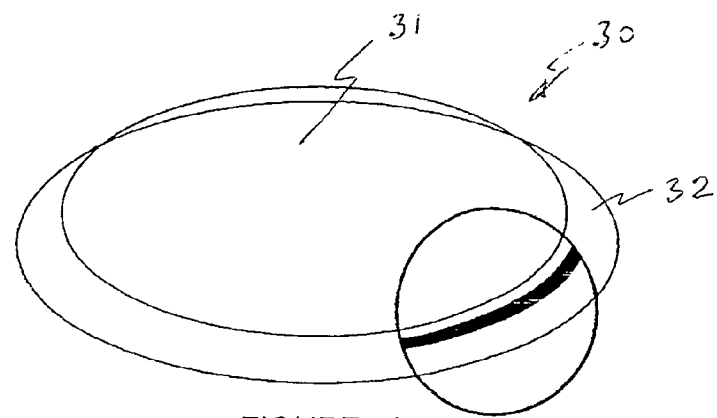
Figure 8B:
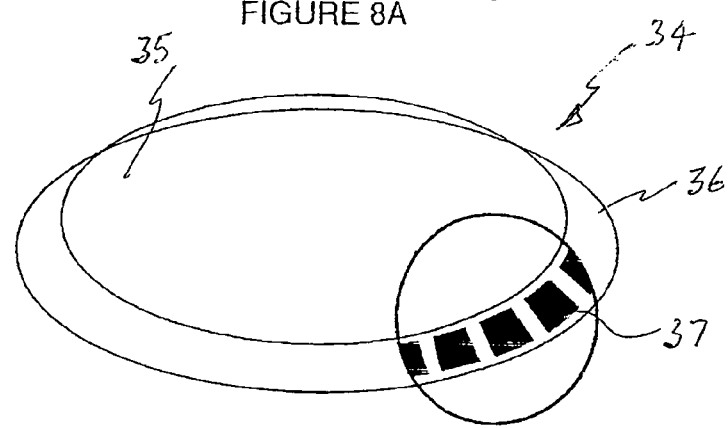

FIG. 8A shows a lens 30 including an optical region 31 and an outer peripheral region 32. According to the embodiment shown outer peripheral region 32 includes an enlarged band 33 which may continuously or intermittently extend circumferentially about lens 30.

FIG. 8A shows a lens 34 including an optical region 35 and an outer peripheral region 36. According to the embodiment shown outer peripheral region 36 includes an intermittent enlarged formation 37 which may intermittently extend circumferentially about lens 34.

Figure 8C:
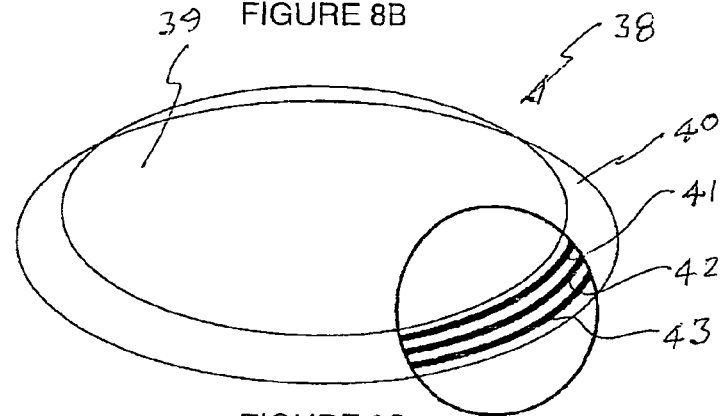

FIG. 8C shows a lens 38 including an optical region 39 and an outer peripheral region 40. According to the embodiment shown outer peripheral region 40 includes an enlarged series of bands 41, 42 and 43 which continuously extend circumferentially about lens 38.

Figure 8D:
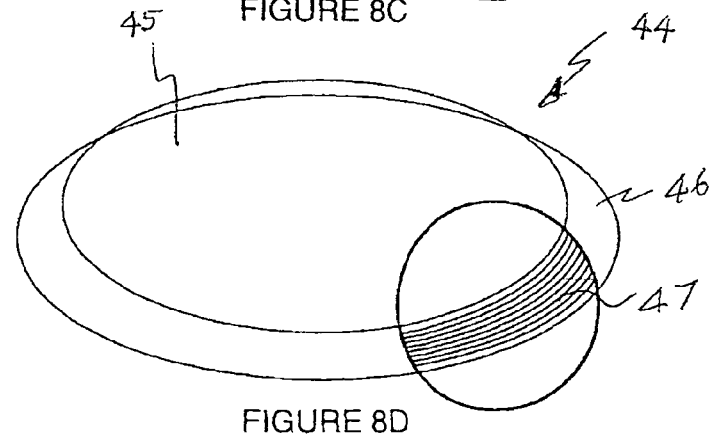
Figure 9A:
Figure 9B:
Figure 9C:
Figure 9D:

FIG. 8D shows a lens 44 including an optical region 45 and an outer peripheral region 46. According to the embodiment shown outer peripheral region 46 includes an enlarged view of a plurality of small lines or bands 47 which continuously extend circumferentially about lens 44.

Each of the non limiting formations described are capable of accommodating lens flexure between the right way out orientation and the inside out orientation.

FIGS. 9a–d show profiles views of lenses according to alternative embodiments in which edge formations have been included in outer regions of the lenses.

FIG. 10 shows a plan view and side elevation of a lens with non limiting examples of enlarged edge formations A–F and surface formations G–I. with posterior and anterior optic zones. Lens 50 of FIG. 10 is shown in plan and profile. The plan view shows lens 50 including outer peripheral edge 51 an outer zone 52 which may be termed a fit zone and an anterior optic zone 53 and posterior optic zone 54. In a lens manufactured according to the invention, the two optic zones 53 and 54 share the optical duties to achieve the required refractive effect. FIGS. 10 A–F show examples of non limiting enlarged edge formations in profile which may be introduced into the lens to achieve the required relief areas. There is a wide variety of options open to the lens designer to achieve the required lens flexing. Formations 10 A, B, C and F are symmetrical whereas formations 10 D, and E are asymmetrical. FIG. 10 also shows examples of enlarged formations G, H and I which may be located on peripheral outer zone 52. The same formations of G, H and I are shown in profile adjacent the profile view of lens 50.

FIG. 11 shows a plan view and side elevation of a lens with non limiting examples of enlarged edge formations A–F and surface formations G–I with an anterior. The lens of FIG. 11 is substantially the same as that of FIG. 10 except that a back optic zone is omitted. The plan view shows lens 60 including outer peripheral edge 61 an outer zone 62 which may be termed a fit zone and an anterior optic zone 63. In a lens manufactured according to the embodiment of FIG. 11, optic zone 63 assumes the optical duties to achieve the required refractive effect. Refractive correction by this lens is thus achieved on its anterior surface 63.

FIG. 11 also shows examples of enlarged formations G, H and I which may be located on peripheral outer zone 62. The same formations of G, H and I are shown in profile adjacent the profile view of lens 60. It can be seen that there are potentially a wide variety of formations and profiles which can achieve the objects of the invention described herein.

According to another embodiment, the lens employs the use of concentrically positioned alternating optical zones or bands that incorporate optical changes and shifts such that the lens in situ can generate a bifocal or multifocal effect. The alternating bands could also be designed to create a single vision effect or to create aspheric or other such optical effects the designer should desire. Arranging the alternating bands of differing power or surface geometry on both the anterior and posterior surfaces to create conflicting or complimentary effects could also be useful to the designer. In an alternative embodiment, the lens uses at least one relieving area within the optical area such that the relieving area assists in the reorientation of the lens when it is positioned on the eye in either it's conventional orientation or inverted orientation. The use of thoughtful design principles could achieve this affect without sacrificing optical effectivity. In a further embodiment, the lens employs such surface geometry which is generated by non-rotationally symmetrical means and such geometry being able to be altered or tailored to the designers wishes by virtue of its orientation on the eye.

The use of colouration of lenses may be adapted to the lens according to the present invention. There has been an increase in the popularity and usage of coloured or opaque tinted contact lenses around the world. These lenses most commonly have a coloured iris pattern printed or bonded on the anterior surface or affixed within the matrix of the lens and are capable of changing the natural eye colour to something new. A wearer with brown irides for example can change their eye colour to blue by wearing a pair of blue opaque tinted contact lenses. Currently they are coloured in such a way that they are effective on one side of the lens only. This is because the base curve side is always fitted facing the eye and would not benefit from having any specific colour. As such there can be only one colour per lens. There are many wearers however that wish to have more than one choice of colour and at present have to purchase more than one pair of lenses to achieve this. According to one embodiment of the invention a wearer has the choice of two colours by the simple action of reorienting their lenses on their eyes. For example, the anterior side of the lens may be tinted blue whilst the posterior side may be tinted green. According to the orientation of the lens, the patient's eye colour could be either green or blue.

According to another embodiment, a lens is provided with colouration on one or both sides of the lens. The lens may be prepared with, the same colour on both sides (this might be preferred where flexing provides an alternative refractive correction without a colour change upon flexing), two different colours, one on each side. The lens may also be prepared with more than one colour on one or both sides. The above colour regimes may be employed in the flexing lens irrespective of whether a wearer requires a refractive correction or not. In the case of a coloured lens with no refractive correction the flexing would would be for a cosmetic colour change.

Advantages of such a lens design are many and some of them are identified below;

The lens can be inserted either . . . "inside out" or "the right way out" as the designer or wearer chooses. This makes the wearing of contact lenses far more practical for patients as they no longer have to determine which way the lens should be oriented before insertion. According to the invention the lens would fit in a similar manner whichever way it was placed on the eye. This is advantageous for disposable lenses as they can be handled less before being placed on the eye and they would not need to be orientated upon removal from the disposable packaging. This is a very convenient way to handle lenses every day. It would be appreciated by those skilled in the art of contact lens design that a lens designed and manufactured as described herein would not necessarily require any anti-inversion marking because the lens may be placed right way out or inside out.

The lens may be designed to exhibit a controlled amount of in vivo fitting flexure, depending on its orientation when inserted. This would make the lens useful for optimising a fitting problem without having to resort to the ordering or selecting of a totally new base curve. Both practitioner and patient would find this an advantage depending on the wearer's requirements at the time. An anti-inversion mark would allow the patient to determine the correct orientation.

The lens can optically capitalise on the refractive changes created when either the anterior or the posterior surfaces of the lens are presented to the corneal/scleral profile. The change in surface shape, created by differing wrap effects between the anterior or the posterior surface when either of them are presented to the corneal/scleral profile, may be used to "tune" a lens from the perspective of optimising a refractive result in vivo. Or it may be used to create a mild multifocal effect by way of inducing a planned aspheric or non-spherical shape in vivo and thus create a progressive power shift (this could be in either positive or negative direction in relation to the apical power). This type of lens would be very useful to a patient who wanted to wear single vision lenses at times and yet wanted to wear bifocal or multifocal lenses at others. The wearer could obtain a bifocal or multifocal effect at their discretion, simply by removing the lenses and reinserting them in their opposing orientation. Alternatively the wearer may find the reorientation of just one of the lenses to be optimal also. This design principle allows the wearer to enjoy a very flexible wearing regime, depending on the designs used.

The lens may also be designed to enhance an otherwise standard monovision fitting regime by offering a choice of at least two power alternatives per lens, depending on the orientation of each of the lenses. This actually creates a possibility of wearing four different powers or four different optical variances from only two lenses. Obviously this presents as a significant advantage to the practitioner and patient alike.

The above mentioned monovision fitting regime can be further enhanced by virtue of at least one of the lenses being able to create a multifocal effect when worn and being able to vary that multifocal effect when inverted in wearing orientation. This would offer even more flexibility and variability to the practitioner and patient and would allow for far more accurate fine tuning of any given monovision or multifocal fitting regime.

Another advantageous version of this lens design principle is the enhancement of it's optical advantages or features by the judicious use of freznel or freznel style optical principles. A lens manufactured with a diffractive type of optical design principle incorporated, could very easily create alternate optical results when fitted to the eye in both the conventional and opposite orientation. The optical eschelets will experience a change in their principle diffracting angles along with the change in wrap effect in vivo when the lens is fitted to the eye in either its conventional or "inside out" orientation.

Further understanding of this design concept demonstrates that the above mentioned advantages, designs, variations and permutations of designs and concepts are applicable to all known soft contact lens types. They may include, but not be limited to, spherical lenses, toroidal lenses, bifocal or multifocal lenses, non rotationally symmetrical lenses and wavefront aberration control lenses.

It can be appreciated by those skilled in the art that there are many derivations and variations of the above designs that could be anticipated and as such should be included in this specification as if they themselves were listed here.

The claims defining the invention are as follows:

1. A soft contact lens for fitting to an eye of a wearer in either a right way out orientation or in an inside out orientation; the lens including first and second generally arcuate surfaces each terminating at an edge of the lens; wherein, each of said first and second surfaces are capable of forming either an anterior convex or posterior concave surface; wherein in said right way out orientation there is provided an anterior convex surface and a posterior concave surface, and in said inside out orientation said right way out anterior convex surface is converted to a posterior concave surface and said right way out posterior concave surface is converted to a convex anterior surface, and wherein said lens satisfies fit criteria in both said inside out and said right way out orientation.

2. A soft contact lens according to claim 1 wherein said conversion is effected by flexing of the lens.

3. A soft contact lens according to claim 2 wherein said lens flexure is accommodated by at least one formation on at least one of said first and second surfaces.

4. A soft contact lens according to claim 3 wherein said at least one formation provides means to assist flexure when said lens flexes between said right way out and said inside out orientations.

5. A soft contact lens according to claim 4 wherein said at least one formation is disposed anywhere on at least one of said first and second surfaces of said lens and wherein said at least one formation allows said lens to satisfy said fit criteria when said lens is in either the right way out or inside out orientation and irrespective of whether a lens base curve is oriented towards a cornea or faces away from said cornea.

6. A soft contact lens according to claim 5 wherein said at least one formation results from an adjustment to a surface contour of at least one of said first and second surfaces.

7. A soft contact lens according to claim 6 wherein said at least one formation originates at a lens center and propogates radially in any meridian towards the lens edge.

8. A soft contact lens according to claim 6 wherein said at least one formation comprises at least one circumferentially disposed region comprising at least one band defined by a thinning or thickening in said lens at said region.

9. A soft contact lens according to claim 6 wherein said at least one formation comprises at least one spiral region on at least one of said first and second surfaces of said lens.

10. A soft contact lens according to claim 6 wherein said at least one formation comprises at least one oblique region on at least one of said first and second surfaces of said lens; wherein said at least one oblique region lies at an angle to any meridian of said lens.

11. A soft contact lens according to claim 6 wherein said at least one formation in at least one of said first and second surfaces of said lens comprises one or more features selected from the group consisting of recesses, surface dimples, grooves, indents, circumferential bands, lines, fenestrations, dots, waveforms, reliefs, troughs, regions of thinning, regions of thickening, spirals and oblique lines.

12. A soft contact lens of claim 11 wherein said at least one formation is positioned in a peripheral area of said lens in a site which optimizes a resistance relieving role performed by said at least one formation when said lens undergoes flexure.

13. A soft contact lens according to claim 12 wherein lens wrapping forces are adjusted to counter a natural tendency of said lens capable of use right way out or inside out to evert off of said eye.

14. A soft contact lens according to claim 13 wherein non curved surfaces are used to eliminate said eversion tendency.

15. A soft contact lens according to claim 14 wherein subtle differences in fitting characteristics of said lens are made by adjusting flexure resistance values of at least one of said anterior or posterior surfaces of said lens.

16. A soft contact lens according to claim 3 wherein said at least one formation is disposed in at least one of an optic zone and a fit zone.

17. A soft contact lens according to claim 3 wherein optical performance, centration and fit of said lens are not affected by said at least one formation.

18. A soft contact lens according to claim 1 wherein a variety of refractive corrections are effected by at least one of said anterior and posterior surfaces in said right way out configuration and by at least one of said anterior and posterior surfaces formed in said inside out orientation.

19. A soft contact lens according to claim 18 wherein means for refractive correction by said lens is distributed across said anterior and posterior surfaces irrespective of whether said lens is in said right way out orientation or said inside out orientation.

20. A soft contact lens according to claim 18 wherein said lens satisfies specific and different optical corrections for an individual wearer depending on selection of said right way out or said inside out orientation.

21. A soft contact lens according to claim 20 wherein said lens includes a predetermined optical correction via one of said first and second surfaces and their orientation, and a second optical correction via an opposite surface when said first and second surfaces are reversed.

22. A soft contact lens according to claim 20 wherein said lens includes a bifocal correction when said first and second surfaces are oriented in one way and a single vision optical correction when said first and second surfaces are reversed.

23. A soft contact lens according to claim 20 wherein said lens includes one or more bifocal corrections irrespective of said orientation of said first and second surfaces of said lens.

24. A soft contact lens according to claim 20 wherein said lens provides one optical correction when in a first orientation of said first and second surfaces and a different single optical correction when said first orientation of said first and second surfaces is reversed.

25. A soft contact lens according to claim 20 wherein said lens includes same multi focal corrections depending upon a particular orientation of said first and second surfaces of said lens.

26. A soft contact lens according to claim 20 wherein said lens includes one optical correction according to a first orientation of said first and second surfaces and a multi focal correction according to a reversed orientation of said first and second surfaces.

27. A soft contact lens according to claim 3 wherein said lens is selected from the group consisting of spherical, toriodal and rotationally non symmetrical.

28. A soft contact lens according to claim 1 wherein said lens includes at least one color on at least one surface of said lens.

29. A soft contact lens according to claim 1 wherein said lens includes at least one color on one surface of said lens and at least one color on an opposite surface of said lens.

30. A soft contact lens according to claim 29 wherein said lens imparts a particular color to said eye of said wearer when said first and second surfaces are orientated one way and another color when said orientation is reversed.

31. A soft contact lens according to claim 3 wherein satisfactory fitting of said lens in either orientation is achieved by one or more of reduction, removal and reshaping of naturally occurring areas of resistance created in conventional lens designs.

32. A soft contact lens according to claim 31 wherein subtle differences in said lens fitting characteristics are achieved by adjusting resistance values of said anterior and posterior surfaces.

33. A soft contact lens according to claim 3 wherein said at least one formation allows said lens to adjust and reposition normals to no strain boundary as said lens is reoriented for fitting to said eye; thereby allowing said lens to wrap naturally in either said right way out or inside out orientation when fitted to said eye, thereby avoiding lifting of said lens edges.

34. A method of fitting a contact lens to an eye of a wearer; said lens including first and second generally arcuate surfaces terminating in a lens edge; wherein each said first and second surface is capable of forming either an anterior convex or posterior concave surface; wherein in a right way out orientation there is provided said anterior convex surface and said posterior concave surface and in an inside out orientation said right way out anterior convex surface is converted to said posterior concave surface and said right way out posterior concave surface is converted to said convex anterior surface, and wherein said lens satisfies fit criteria in either said inside out or said right way out orientation; the method comprising the steps of:
   a) fitting said lens to said eye in said right way out orientation;
   b) removing said lens and refitting said lens in said inside out orientation.

35. A method according to claim 34 comprising the further step, prior to refitting, of flexing said lens between said right way out orientation and said inside out orientation.

36. A method of fitting a contact lens to an eye of a wearer; said lens including first and second generally arcuate surfaces terminating in a lens edge; wherein each said first and second surface is capable of forming either an anterior convex or posterior concave surface; wherein in a right way out orientation there is provided said anterior convex surface and said posterior concave surface and in said inside out orientation said right way out anterior convex surface is converted to said posterior concave surface and said right way out posterior concave surface is converted to said convex anterior surface, and wherein said lens satisfies fit criteria in either said inside out or said right way out orientation; the method comprising the steps of:
   a) fitting said lens to said eye in said inside out orientation;
   b) removing said lens and refitting said lens in said right way out orientation.

37. A method according to claim 36 comprising the further step, prior to refitting, of flexing said lens between said inside out orientation and said right way out orientation.

38. A soft contact lens according to claim 20 wherein said lens includes different multi focal corrections depending upon the particular orientation of said first and second surfaces of said lens.

39. A soft contact lens for fitting to an eye of a wearer in either a right way out orientation or in an inside out orientation; the lens including first and second generally arcuate surfaces each terminating at an edge of the lens; wherein each of said first and second surfaces are capable of forming either an anterior convex or posterior concave surface; wherein in said right way out orientation there is provided an anterior convex surface and a posterior concave surface, and in said inside out orientation said right way out anterior convex surface is converted to a posterior concave surface and said right way out posterior concave surface is converted to a convex anterior surface, and wherein said lens is capable of conforming to a corneal/scleral profile in both said right way out and said inside out orientation.

40. A soft contact lens according to claim 39 wherein said conversion is effected by flexing of the lens.

41. A soft contact lens according to claim 40 wherein said lens flexure is accommodated by at least one formation on at least one of said first and second surfaces.

42. A soft contact lens according to claim 41 wherein said at least one formation provides means to assist flexure when said lens flexes between said right way out and said inside out orientations.

43. A method of fitting a contact lens to an eye of a wearer; said lens including first and second generally arcuate surfaces terminating in a lens edge; wherein each said first and second surface is capable of forming either an anterior convex or posterior concave surface; wherein in a right way out orientation there is provided said anterior convex surface and said posterior concave surface and in said inside out orientation said right way out anterior convex surface is converted to said posterior concave surface and said right way out posterior concave surface is converted to said convex anterior surface, and wherein said lens is capable of conforming to a corneal/scleral profile in both said right way out and said inside out orientation; the method comprising the steps of:
   a) fitting said lens to said eye in said inside out orientation;
   b) removing said lens and refitting said lens in said right way out orientation.

44. A method according to claim 43 comprising the further step, prior to refitting, of flexing said lens between said inside out orientation and said right way out orientation.

* * * * *